United States Patent [19]

Tarsia et al.

[11] Patent Number: 4,497,574
[45] Date of Patent: Feb. 5, 1985

[54] SLIDE SUPPORTING ASSEMBLY FOR COLOR-SLIDE DUPLICATOR

[75] Inventors: Joseph Tarsia; Alexander S. Ross; Marina Gertsek, all of Cedar Knolls, N.J.

[73] Assignee: Kenro Corporation, N.J.

[21] Appl. No.: 503,818

[22] Filed: Jun. 13, 1983

[51] Int. Cl.³ .............................................. G03B 27/62
[52] U.S. Cl. ........................................ 355/76; 355/63; 355/125
[58] Field of Search ...................... 355/75, 76, 125, 63

[56] References Cited

U.S. PATENT DOCUMENTS

| | | | |
|---|---|---|---|
| 3,280,695 | 10/1966 | Brandt | 355/76 |
| 3,604,328 | 9/1971 | Nakagawa | 355/75 |
| 4,161,365 | 7/1979 | Anderson et al. | 355/75 |
| 4,353,645 | 10/1982 | Kogane et al. | 355/75 |
| 4,396,281 | 8/1983 | Okabe et al. | 355/76 |
| 4,433,910 | 2/1984 | Tarsia | 355/76 |
| 4,455,082 | 6/1984 | Lepist | 355/75 |

Primary Examiner—Monroe H. Hayes
Attorney, Agent, or Firm—Alvin Sinderbrand

[57] ABSTRACT

In a color-slide duplicator having a housing containing a light source which illuminates an opening in a housing wall, and a support for a camera above the housing for photographic reproduction of a slide to be duplicated; an assembly for supporting the slide comprises a carrier plate releasably and adjustably secured by magnets to the housing wall so as to span the illuminated opening which registers, at least in part, with an aperture in the carrier plate, and first and second parallel guide bars having undercut, beveled edges facing toward each other and being arranged on the carrier plate at opposite sides of the aperture in the latter, with one of the guide bars being movable laterally and resiliently urged in the direction toward the other guide bar, such guide bars being included in a quick-release mechanism by which the slide to be duplicated is positioned and held against the carrier plate over the aperture therein. In the case of a slide having a rigid frame, opposing side edges of the frame can be directly engaged by the beveled guide bar edges. When the slide is an unmounted flexible film, a bearing and masking plate with an aperture registering, at least in part, with the carrier plate aperture is engaged, at opposing side edges, by the beveled guide bar edges to be urged thereby against the carrier plate with the flexible film held flat between the carrier and bearing plates.

11 Claims, 10 Drawing Figures

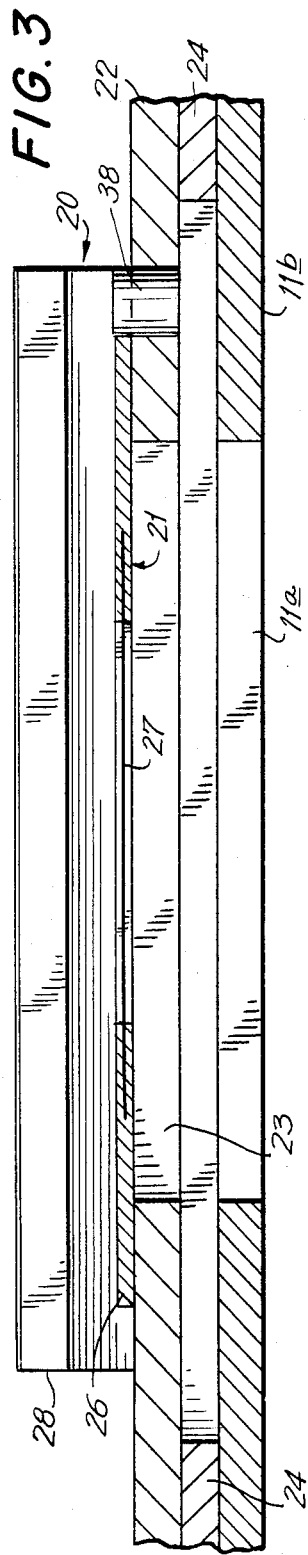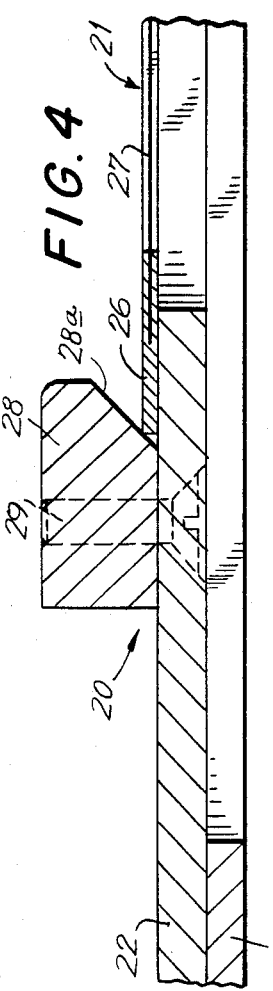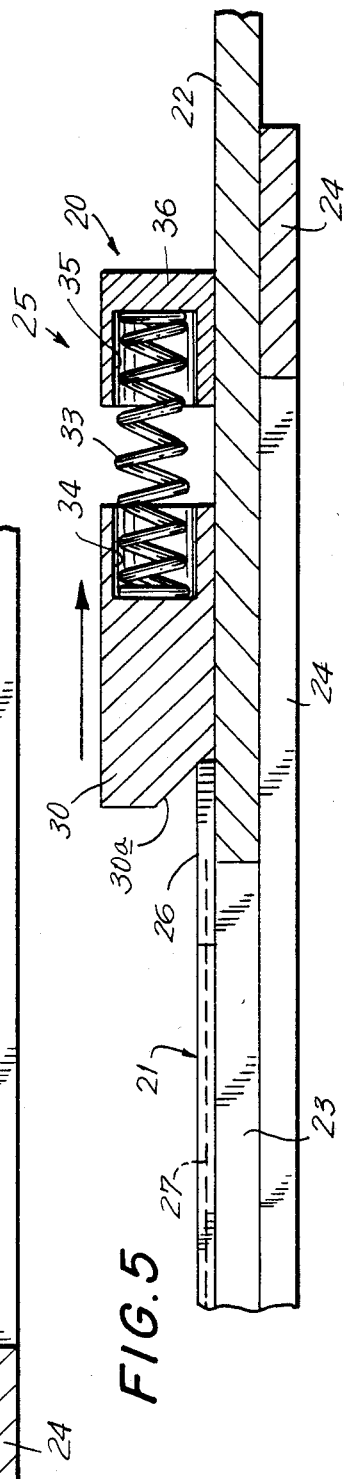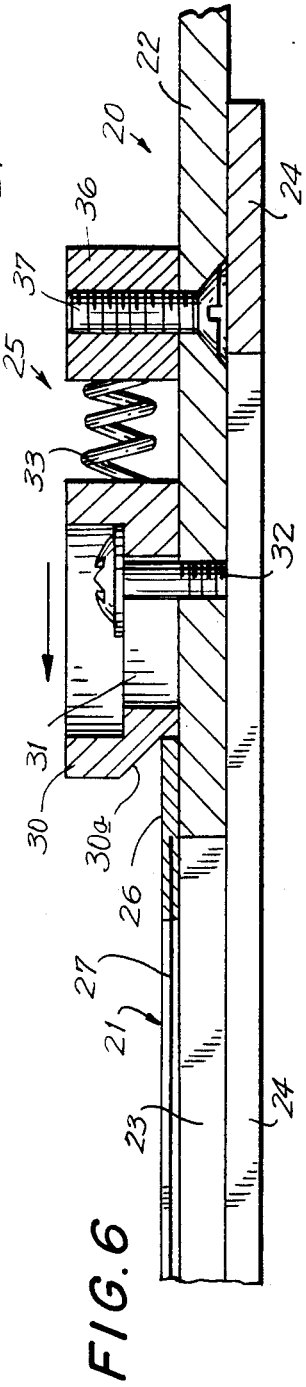

4,497,574

SLIDE SUPPORTING ASSEMBLY FOR COLOR-SLIDE DUPLICATOR

BACKGROUND OF THE INVENTION

1. Field of the Invention

This invention relates generally to color-slide duplicators of the type in which a color-slide is positioned over an opening in a wall of a housing containing a light source so that the slide can be photographically reproduced by a camera supported above the housing, and more particularly is directed to an improved assembly for supporting a slide to be duplicated over the illuminated opening of the housing.

2. Description of the Prior Art

Color slide duplicators exist in which a housing contains a light source for illuminating an opening in a wall of the housing over which there is supported a slide to be duplicated, and a camera is supported above the housing for photographically reproducing the supported slide. In such existing color-slide duplicators, for the purpose of supporting the slide to be duplicated above the illuminated opening of the housing, a carrier plate is fixedly secured to the housing, as by screws, and has an aperture registering with the illuminated opening. Guide bars are mounted on the carrier plate at opposed sides of the aperture and are formed with V-shaped grooves opening laterally toward each other along their confronting edge surfaces. Further, one of the guide bars is urged resiliently in the lateral direction toward the other. Thus, a slide to be duplicated has its opposite edges engaged in the V-shaped grooves of the guide bars so as to be positioned for illumination through the carrier plate aperture from the housing opening therebelow. Since the carrier plate is fixed relative to the housing, the position of the slide relative to the field of view of the camera cannot be readily changed and, therefore, is not convenient to reproduce or duplicate only a selected portion of the slide. Further, if the slide has a substantially rigid frame engaged in the V-shaped grooves of the guide bars, the slide may be fairly satisfactorily positioned in a substantially flat plane relative to the illuminated opening. However, if the slide is unmounted, that is, merely constituted by a flexible film without a rigid supporting frame therebout, the resilient force urging one guide bar laterally toward the other buckles the film out of a flat plane when opposed edges of the film are received in the V-shaped grooves of the guide bars. Thus, when an unmounted slide is duplicated distortion is likely to occur. Further, the described slide supporting arrangements in the existing color-slide duplicators are not suitable for accurately and reliably positioning two or more superposed slides when it is desired to reproduce a composite image therefrom. More particularly, due to the V-shaped grooves in the guide bars, at least one of the super-posed slides will not be firmly gripped by the guide bars.

OBJECTS AND SUMMARY OF THE INVENTION

Accordingly, it is an object of this invention to provide a slide supporting assembly for a color-slide duplicator which avoids the above-mentioned disadvantages of the prior art.

More specifically, it is an object of this invention to provide a slide supporting assembly for a color-slide duplicator which is conveniently exchangeable for accommodating either an unmounted slide of flexible film or a slide with a substantially rigid frame.

Another object is to provide a slide supporting assembly, as aforesaid, which is conveniently adjustable in respect to the color-slide duplicator for selecting a portion of the supported slide which is to be photographically reproduced, and which may be determined by observing the slide through the view finder of the camera.

A further object is to provide a slide supporting assembly, as aforesaid, which is capable of reliably and securely positioning two or more superposed slides when it is desired to produce a composite of the several images.

A further object of the invention is to provide a slide supporting assembly, as aforesaid, which is particularly adapted for accommodating a slide constituted by an unmounted, flexible film strip which is held flat during its duplication or photographic reproduction, and which is readily released for movement relative to the supporting assembly, as when the film strip is to be moved longitudinally in respect to the supporting assembly for selecting a frame thereof to be duplicated or reproduced.

In accordance with an aspect of this invention, a color-slide duplicator having a housing containing a light source which illuminates an opening in a housing wall is further provided with a slide supporting assembly comprising a carrier plate dimensioned to span the illuminated opening and having an aperture, magnetic means for releasably securing the carrier plate to the housing wall in an adjustable position at which the aperture of the carrier plate registers, at least in part, with the illuminated opening in the housing wall, and quick-release means for positioning a slide to be duplicated on the carrier plate over the aperture and for holding the slide against the carrier plate.

In a preferred embodiment of the invention, the above mentioned quick-release means includes first and second parallel guide bars having undercut, beveled edges facing toward each other and being arranged on the carrier plate at opposite sides of the aperture in the latter, with one of the guide bars being movable laterally and being acted upon by resilient or yieldable means urging that bar in the direction toward the other guide bar. When the slide to be duplicated has a substantially rigid frame, side edges of the frame are directly engaged by the undercut, beveled edges of the guide bars so as to hold the slide flat against the carrier plate under the urging of the resilient or yieldable means acting on one of the guide bars. In the event that the slide to be duplicated is unmounted, the quick-release means further includes a bearing or masking plate having an aperture registering, at least in part, with the carrier plate aperture and being engaged at opposed edges of the bearing plate by the undercut, beveled edges of the guide bars so that the resilient or yieldable means acting laterally on one of the guide bars urges the bearing plate against the carrier plate with the flexible film or unmounted slide therebetween.

It is a further feature of this invention, in the case of the embodiment of the slide supporting assembly for accommodating an unmounted slide, to further provide leaf spring means extending under the bearing plate adjacent the laterally movable guide bar for raising the bearing plate relative to the carrier plate, and thereby releasing the slide therebetween, when the laterally movable guide bar is displaced in the direction away from the other guide bar.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIGS. 3, 4, 5 and 6 are enlarged sectional views taken along the lines 3—3, 4—4, 5—5 and 6—6, respectively, on FIG. 2;

DETAILED DESCRIPTION OF THE PREFERRED EMBODIMENTS

Figure 1:
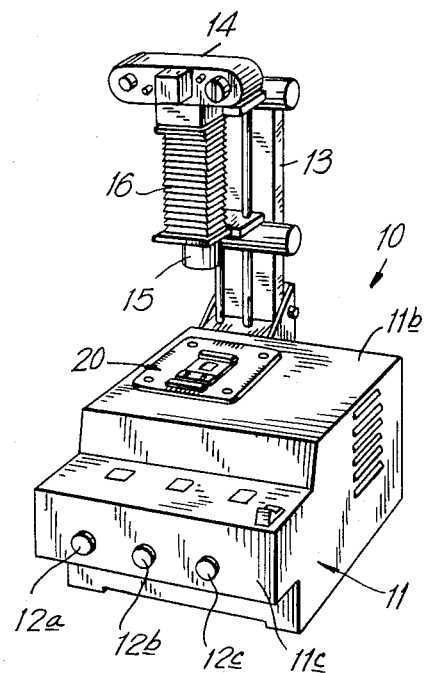
FIG. 1 is a perspective view of a color-slide duplicator having a slide supporting assembly according to an embodiment of this invention.
Figure 2:
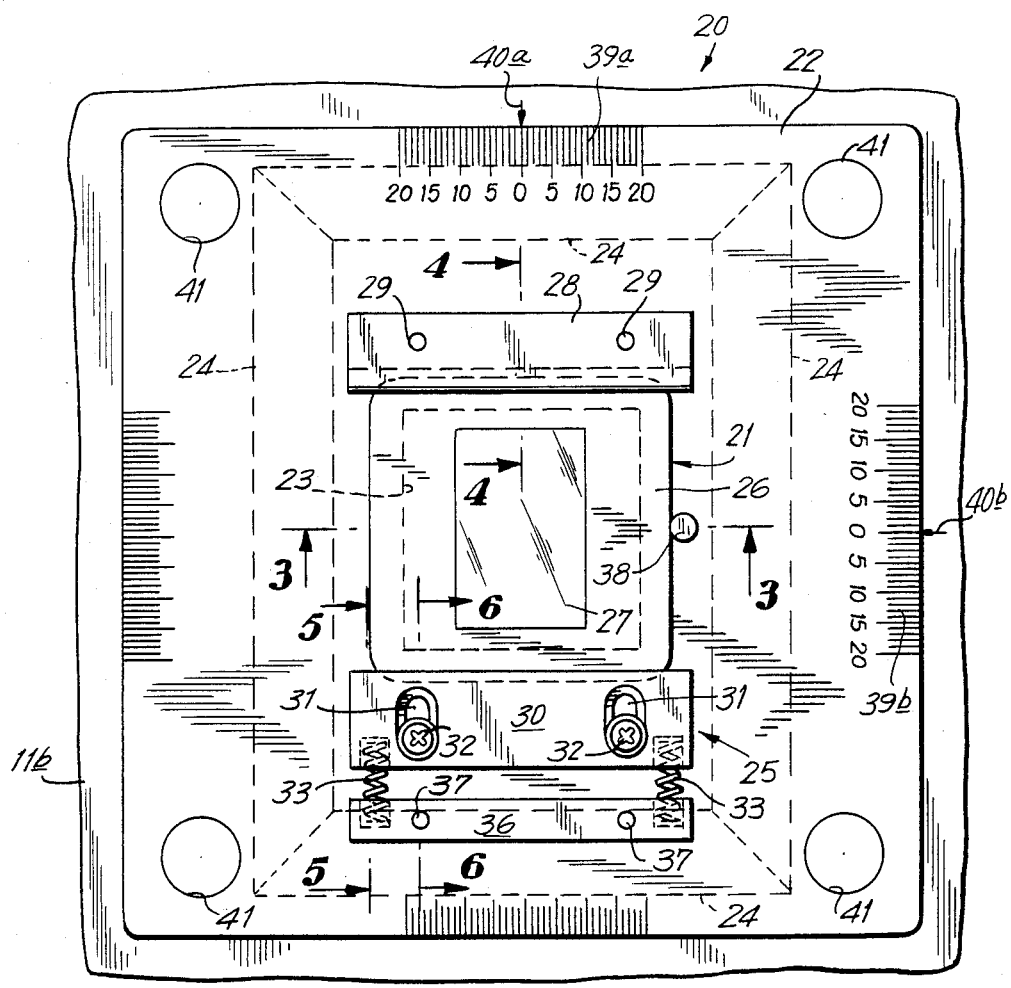
FIG. 2 is a top plan view of the slide supporting assembly according to the embodiment of the invention shown on FIG. 1.
Figure 7:
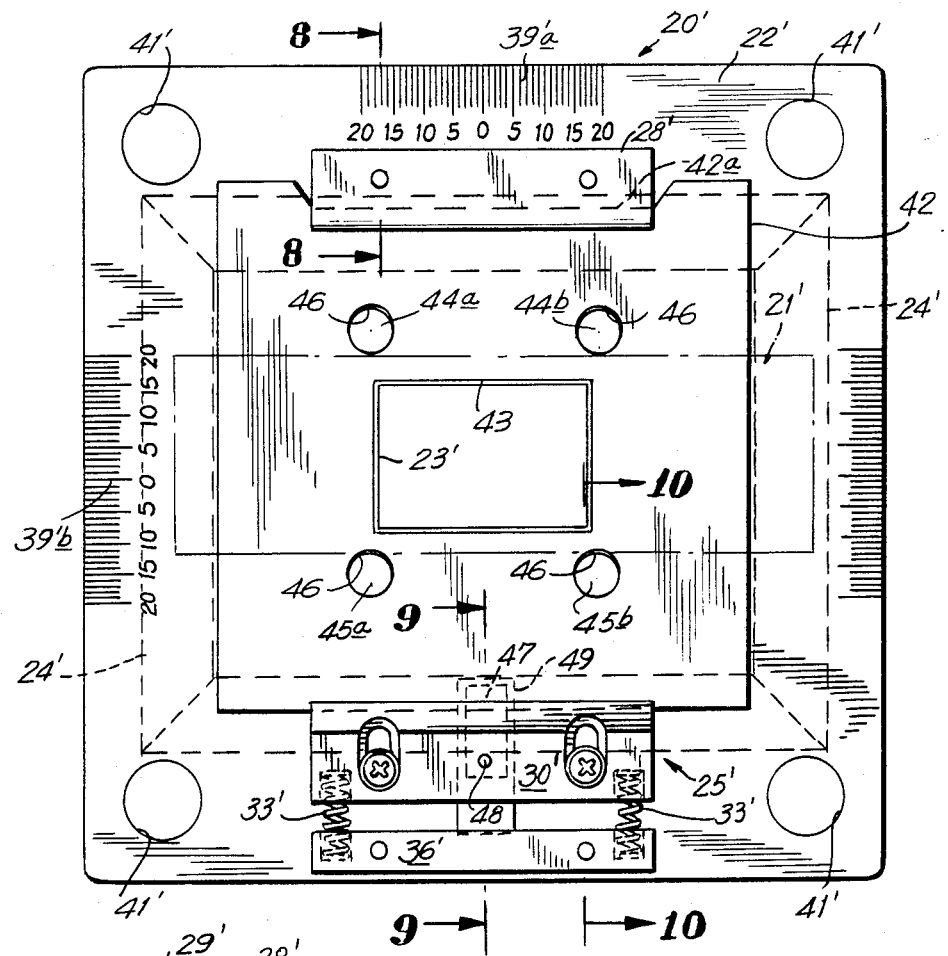
FIG. 7 is a top plan view similar to that of FIG. 2, but showing a slide supporting assembly according to another embodiment of this invention.

Referring to the drawings in detail, and initially to FIG. 1 thereof, it will be seen that a color-slide duplicator of a type to which the present invention may be advantageously applied is there generally identified by the reference numeral 10, and comprises a housing 11 containing a suitable light source (not shown), such as, a halogen quartz lamp, for illuminating an opening 11a (FIG. 3) in a top wall 11b of housing 11. The duplicator 10 is desirably provided with a conventional filtration arrangement for variable color correction of the light illuminating opening 11a in respect to cyan, yellow and magenta, for example, in response to manual adjustment of knobs 12a, 12b and 12c, respectively, at the front 11c of housing 11. A column 13 extends upwardly from housing 11, at the back of the latter, and suitably supports a camera 14, lens 15 and intervening bellows 16 for adjustment along column 13 so that a slide positioned above illuminated opening 11a of housing 11 can be photographically reproduced by camera 14.

Referring now to FIGS. 2-6, it will be seen that, in accordance with an embodiment of this invention, an assembly 20 for supporting a slide 21 during its photographic reproduction by camera 14 of duplicator 10 comprises a carrier plate 22 of substantially square configuration dimensioned to span opening 11a in housing wall 11b and having an aperture 23 which is adapted to register, at least in part, with the opening 11a. Carrier plate 22 is magnetically secured on housing wall 11b so as to be readily releasable and adjustable in respect to housing wall 11b. For example, in the case where housing 11, or at least the wall 11b thereof, is formed of a ferromagnetic material, the releasable magnetic attachment of carrier plate 22 to housing 11 can be effected by magnets 24 suitably secured to the underside of carrier plate 22 at substantial distances from the perimeter of aperture 23, as shown on FIG. 2.

Mounted on carrier plate 22 is a quick-release mechanism 25 for positioning slide 21 on carrier plate 22 over aperture 23 and for holding slide 21 closely against the upper surface of carrier plate 22. In the case of slide supporting assembly 20 shown on FIGS. 2-6 and intended for use with a slide which, as shown, includes a relatively rigid frame 26 of cardboard, plastic or the like with a rectangular perimeter in which the image-bearing flexible film 27 is securely mounted, the quick-release mechanism 25 is constituted by a first guide bar 28 fixed, as by screws 29, on carrier plate 22 so as to extend along one side of aperture 23, and a second guide bar 30 extending parallel to the first guide bar 28 at the side of aperture 23 opposite to the side thereof along which guide bar 28 extends. The second guide bar 30 is mounted on carrier plate 22 for movement relative thereto in the lateral direction, that is, toward and away from first guide bar 28. For example, guide bar 30 may be formed with laterally elongated slots 31 (FIGS. 2 and 6) extending through opposite end portions of guide bar 30 and slidably receiving guide screws 32 which are secured in respective tapped holes in carrier plate 22. Guide bar 30 is yieldably urged laterally in the direction toward the other guide bar 28, for example, by helical compression springs 33 seated, at their opposite ends, in sockets 34 and 35 (FIG. 5) formed in end portions of guide bar 30 and of a back-up bar 36 which is secured to carrier plate 22, as by screws 37. In accordance with this invention, and as shown particularly on FIGS. 4-6, guide bars 28 and 30 have under-cut, beveled edges 28a and 30a extending along the sides thereof which face each other.

It will be appreciated that, when slide 21 is to be disposed in assembly 20, the laterally movable guide bar 30 is manually displaced toward the right, as viewed on FIGS. 5 and 6, against the force of springs 33 to permit the frame 26 to pass downwardly between the confronting edge surfaces of guide bars 28 and 30. With slide 21 resting on carrier plate 22 between guide bars 28 and 30, guide bar 30 is released to permit springs 33 to urge the guide bar 30 laterally toward the left, as viewed on FIGS. 5 and 6, with the result that opposed edges of frame 26 are acted upon by beveled edge surfaces 28a and 30a and the force of springs 33 securely positions slide 21 between guide bars 28 and 30 and also holds the slide downwardly against the upper surface of carrier plate 22.

The assembly 20 according to the invention is further shown to include a guide pin or stop 38 (FIGS. 2 and 3) extending from carrier plate 22 between guide bars 28 and 30 adjacent one end of the guide bars so as to be engageable by frame 26 of slide 21 for determining the position of the latter in the direction along the beveled edges 28a and 30a. It will be appreciated that, when it is desired to remove slide 21 from assembly 20, it is only necessary to manually displace guide bar 30 laterally away from guide bar 28 against the force of springs 33 for freeing the adjacent edge portion of frame 26 from beveled edge 30a and thereby permitting slide 21 to be lifted bodily from between guide bars 28 and 30.

When assembly 20 is used for supporting a slide 21 during its photographic reproduction on duplicator 20, such slide 21 is first positioned on carrier plate 22 between guide bars 28 and 30 and against guide pin or stop 38, as described above, with the result that the image bearing film 27 exposed within frame 26 is positioned above aperture 23. Then carrier plate 22 is disposed on housing wall 11b and magnetically held to the latter by magnets 24. While viewing slide 21 through the view finder of camera 14, carrier plate 22, while being magnetically adhered to housing wall 11b, can be horizontally adjusted, for example, in orthogonally related directions, for selecting a portion of the slide to be duplicated. In order to permit the noting and eventual repetition of the conditions used for reproduction of the slide or a portion thereof, carrier plate 22 is desirably provided with orthogonal scales 39a and 39b (FIG. 2) which cooperate with respective indices 40a and 40b on housing wall 11b, or with respective cross hairs in the view finder of camera 14, for indicating the extent and direction of the displacement of the center of carrier plate 22 from the center of the illuminated opening 11a in housing wall 11b.

Although it is intended that carrier plate 22 should be adjustable and releasable in respect to housing wall 11b reason of the magnets 24 holding plate 22 to wall 11b, as that arrangement permits the above described easy selection of a portion of the slide to be reproduced, carrier plate 22 may be also provided with holes 41 adjacent its corners for receiving screws with knurled heads or the like by which the carrier plate may be fixedly secured on the housing of a color-slide duplicator, as in the prior art.

By reason of the undercut, beveled configuration of edges 28a and 30a on guide bars 28 and 30, assembly 20 can be used to reliably hold two or more superposed slides when a composite of the respective images of the slides is to be reproduced. In that case, the beveled edges 28a and 30a act, with downward components, against the respective edges of the frame of the uppermost slide and all of the superposed slides are thereby held flat against carrier plate 22.

The magnetic, and hence readily releasable attachment of carrier plate 22 to housing wall 11b, in accordance with this invention, is further advantageous in that it permits the rapid exchanging of slide supporting assembly 20 which, as described, accommodates slides having substantially rigid mounting frames, with a slide supporting assembly 20' (FIGS. 7-10) which, in accordance with another embodiment of this invention, is primarily intended to accommodate a slide or slides 21' constituted by an unmounted, flexible film or strip thereof. Except to the extent indicated below, slide supporting assembly 20' is generally similar to the previously described slide supporting assembly 20 and has its corresponding parts, which will not be further described, identified by the same reference numerals but each with a prime appended thereto.

Figure 8:
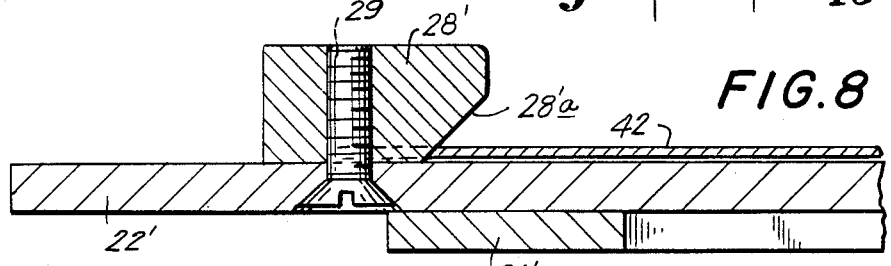
FIGS. 8, 9 and 10 are enlarged sectional views taken along the lines 8—8, 9—9 and 10—10, respectively, on FIG. 7.
Figure 9:
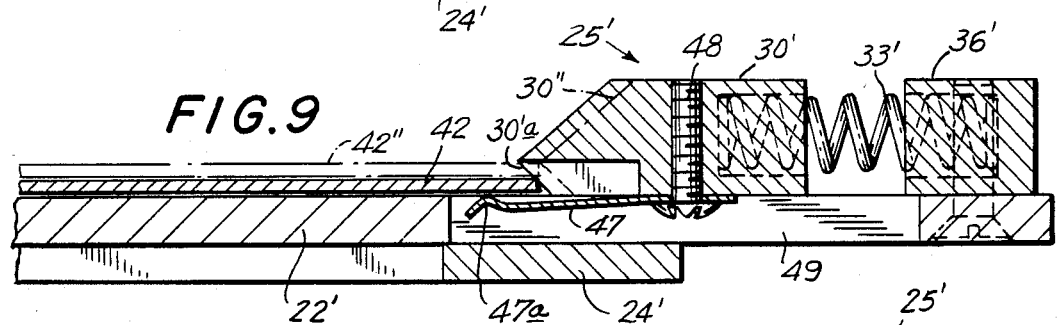
Figure 10:
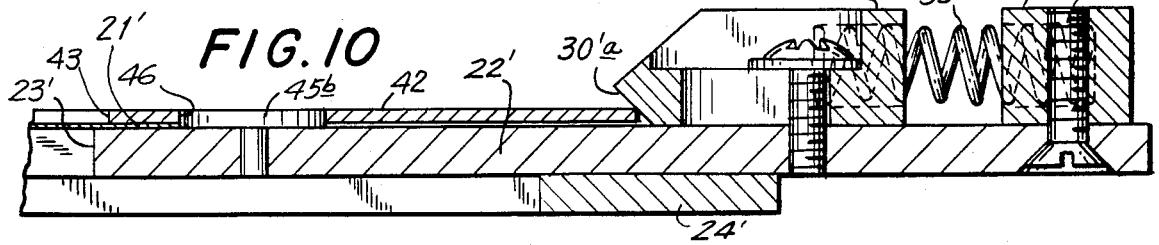

More particularly, slide support assembly 20' is primarily distinguished from the previously described embodiment of this invention by the further inclusion, in its quick-release mechanism 25', of a bearing or masking 42 plate having an aperture 43 (FIGS. 7 and 10) dimensioned to register, at least in part, with the aperture 23' of carrier plate 22'. The bearing plate 42 is engageable, at opposed edges, by the undercut, beveled edges 28'a and 30'a of guide bars 28' and 30' (FIGS. 8-10). Thus, when an unmounted flexible film constituting the slide or slides 21' is disposed between bearing and carrier plates 42 and 22' and beveled edges 28'a and 30'a act upon bearing plate 42 in response to the force of springs 33' against laterally movable guide bar 30', bearing plate 42 is urged downwardly against carrier plate 22' for holding flat the slide or slides 21' therebetween. In this case, it will be apparent that beveled edges 28'a and 30'a of guide bars 28' and 30' do not act directly on the flexible film or strip constituting the slide or slides 21' for guiding the latter. Therefore, a first pair of guide pins 44a and 44b and a second pair of guide pins 45a and 45b are mounted on carrier plate 22' at opposite sides of aperture 23' so as to be engageable with the opposite side edges of the flexible film or strip thereof constituting the slide or slides 21'. The bearing or masking plate 42 has openings 46 dimensioned and positioned to loosely receive the guide pins 44a, 44b, 45a and 45b, respectively, particularly when bearing plate 42 is urged down against carrier plate 22'.

Further, in accordance with this invention, quick-release mechanism 25' of slide supporting assembly 20' includes a leaf spring 47 (FIGS. 7 and 9) secured at one end, as by a screw 48, under laterally movable guide bar 30' and being movable with the latter in a slot 49 formed therefor in carrier plate 22'. The free end portion 47a of spring 47 bears upwardly against the underside of the adjacent edge portion of bearing plate 42 so that, when guide bar 30' is manually displaced in the lateral direction against the force of springs 33', for example, to the position shown in broken lines at 30" on FIG. 9, leaf spring 47 is operative to lift the adjacent edge portion of bearing plate 42, for example, to the position indicted in broken lines at 42". Upon such lifting of the bearing plate to the position 42", the underlying film or strip constituting the slide or slides 21' is released and can be manually displaced in the longitudinal direction relative to carrier plate 22', for example, for aligning another selected frame of the film strip with the apertures 23' and 43. Thereafter, when springs 33' are again allowed to laterally displace guide bar 30' in the direction toward guide bar 28', bearing plate 42 overcomes the force of leaf spring 47 and is urged by beveled edges 28'a and 30'a against carrier plate 22' for again clamping the film or strip in flat condition between plates 42 and 22'. Then, as in the case of the first described embodiment of the invention, the slide supporting assembly 20', while being held magnetically to the surface of housing wall 11b, can be adjusted horizontally in respect to the housing, for example, for determining which portion of the selected frame of the film strip is to be reproduced or duplicated.

It will also be appreciated that, when using the slide supporting assembly 20', two or more slides 21' constituted by respective unmounted flexible films or strips can be superposed and held flat between bearing plate 42 and carrier plate 22' by the action of beveled edges 28'a and 30'a against the respective opposed edges of bearing plate 42.

It is also to be noted, particularly with reference to FIG. 9, that the edge of bearing plate 42 engageable by beveled edge 28'a of guide bar 28' desirably has an elongated cutout 42a therein cooperating with guide bar 28' to position plate 42 in the direction along bar 28' even when plate 42 is raised to the position shown at 42" on FIG. 9. Thus, when plate 42 is again urged against carrier plate 22', it is certain that openings 46 will align with guide pins 44a, 44b, 45a and 45b.

Although illustrative embodiments of this invention have been described in detail herein with reference to the accompanying drawings, it is to be understood that the invention is not limited to those precise embodiments, and that various changes and modifications may be effected therein by one skilled in the art art without departing from the scope or spirit of the invention as defined in the appended claims.

What is claimed is:

1. In a color-slide duplicator having a housing containing a light source and including a wall with an opening therein illuminated by light from said source; a slide supporting assembly comprising a carrier plate dimensioned to span said opening and having an aperture, magnetic means for releasably securing said carrier plate to said wall in an adjustable position at which said aperture registers, at least in part, with the illuminated opening in said wall, and quick-release means for positioning a slide to be duplicated on said carrier plate over said aperture and for holding said slide to be duplicated against said carrier plate.

2. A color-slide duplicator according to claim 1; in which said quick-release means includes a first guide bar with an undercut, beveled edge fixed on said carrier plate along one side of said aperture, a second guide bar parallel to said first guide bar and having an undercut, beveled edge facing toward said beveled edge of the first guide bar, means mounting said second guide bar at a side of said aperture opposite to said one side for movement toward and away from said first guide bar, and yieldable means urging said second guide bar in the direction toward said first guide bar, said quick-release means being releasable from the slide to be duplicated upon displacement of said second guide bar in the direction away from said first guide bar.

3. A color-slide duplicator according to claim 2; in which the slide to be duplicated includes a relatively rigid frame with a rectangular perimeter which, at opposing sides thereof, is engageable by the beveled edges of said first and second guide bars so as to be directly positioned and held against said carrier plate by said first and second guide bars under the urging of said yieldable means acting on said second guide bar.

4. A color-slide duplicator according to claim 3; in which said quick-release means further includes a stop member fixed on said carrier plate between said guide bars and being engageable by the frame of the slide to be duplicated for determining the position of the slide in the direction along said beveled edges.

5. A color-slide duplicator according to claim 2; in which said quick-release means further includes guide pin means projecting from said carrier plate for engagement by the slide to be duplicated.

6. A color-slide duplicator according to claim 5; in which said guide pin means extends from said carrier plate between said guide bars and is engageable by the slide to be duplicated for determining the position of the slide in the direction along said beveled edges.

7. A color-slide duplicator according to claim 5; in which the slide to be duplicated is an unmounted, flexible film; and in which said quick release means further includes a bearing plate having an aperture registering, at least in part, with said aperture of the carrier plate and being engaged at opposed edges of said bearing plate by said beveled edges of the guide bars to be urged against said carrier plate with said flexible film held flat between said carrier and bearing plates, and said bearing plate further has openings loosely receiving said guide pin means so as to be initially positioned by the latter.

8. A color-slide duplicator according to claim 7; in which said guide pin means include first and second pairs of guide pins spaced apart between said first and second guide bars to engage opposite side edges of film being held against said carrier plate by said bearing plate.

9. A color-slide duplicator according to claim 2; in which said quick-release means further includes a bearing plate having an aperture registering, at least in part, with said aperture in the carrier plate and being engaged at opposed edges by said beveled edges of the guide bars to be urged against said carrier plate with the slide to be duplicated being held between the bearing and carrier plates.

10. A color-slide duplicator according to claim 9; in which said quick-release means further includes leaf spring means extending under said bearing plate adjacent one of said guide bars for raising said bearing plate relative to said carrier plate and thereby releasing the slide therebetween when said second guide bar is moved away from said first guide bar.

11. A color-slide duplicator according to claim 10; in which said leaf spring extends from said second guide bar.

* * * * *